(12) United States Patent
Visconti et al.

(10) Patent No.: US 10,817,046 B2
(45) Date of Patent: Oct. 27, 2020

(54) POWER SAVING THROUGH AUTOMATED POWER SCHEDULING OF VIRTUAL MACHINES

(71) Applicant: BMC Software, Inc., Houston, TX (US)

(72) Inventors: Stefano Visconti, Cittiglio (IT); Kanika Dhyani, Pioltello (IT); Jeyashree Sivasubramanian, Wayland, MA (US); Marco Bertoli, Trecate (IT); Luca Poddigue, Pavia (IT)

(73) Assignee: BMC Software, Inc., Houston, TX (US)

( * ) Notice: Subject to any disclaimer, the term of this patent is extended or adjusted under 35 U.S.C. 154(b) by 60 days.

(21) Appl. No.: 16/236,939

(22) Filed: Dec. 31, 2018

(65) Prior Publication Data
US 2020/0209946 A1 Jul. 2, 2020

(51) Int. Cl.
G06F 9/455 (2018.01)
G06F 1/3287 (2019.01)
(Continued)

(52) U.S. Cl.
CPC .............. *G06F 1/3287* (2013.01); *G06F 1/28* (2013.01); *G06F 1/329* (2013.01);
(Continued)

(58) Field of Classification Search
CPC .... G06F 1/3287; G06F 9/45558; G06F 1/329; G06F 1/28; G06F 2009/4557; G06F 2009/45595; G06F 2009/45575
See application file for complete search history.

(56) References Cited

U.S. PATENT DOCUMENTS 9,201,485 B2 12/2015 Dehaan et al.
9,235,441 B2 1/2016 Brech et al.
(Continued)

OTHER PUBLICATIONS

Alshathri et al.: "Sharing with Live Migration Energy Optimization Scheduler for Cloud Computing Data Centers," Future Internet 2018, 10(9), 86, published Sep. 6, 2018, 10 pages.
(Continued)

*Primary Examiner* — Adam Lee
(74) *Attorney, Agent, or Firm* — Brake Hughes Bellermann LLP (57) ABSTRACT

A plurality of virtual machines executing on physical machines may be monitored, and performance data characterizing consumption of physical resources of the physical machines by the plurality of virtual machines during the observation time may be extracted. Each of the plurality of virtual machines may be classified as active or idle during each time division of a plurality of time divisions of the observation time, based on the performance data and on idleness criteria, to thereby generate an active-idle series for each of the plurality of virtual machines. For each active-idle series of each virtual machine of the plurality of virtual machines, at least one periodicity of recurring idle times within the observation time may be determined. Then, for each virtual machine with the at least one periodicity, an on-off schedule may be determined, and each of the virtual machines may be transitioned with the at least one periodicity between an on state and an off state in accordance with the on-off schedule.

20 Claims, 6 Drawing Sheets

(51) Int. Cl.
*G06F 1/28* (2006.01)
*G06F 1/329* (2019.01)

(52) U.S. Cl.
CPC .. *G06F 9/45558* (2013.01); *G06F 2009/4557* (2013.01); *G06F 2009/45575* (2013.01); *G06F 2009/45595* (2013.01)

(56) References Cited

U.S. PATENT DOCUMENTS

| | | | |
|---|---|---|---|
| 9,396,008 | B2 | 7/2016 | Neuse et al. |
| 9,405,572 | B2 | 8/2016 | Breitgand et al. |
| 9,639,379 | B1 | 5/2017 | Suit |
| 9,672,068 | B2 * | 6/2017 | Gaurav ............... G06F 9/4893 |
| 9,846,476 | B1 | 12/2017 | Kulkarni et al. |
| 10,026,070 | B2 | 7/2018 | Thorpe et al. |
| 2009/0265707 | A1 | 10/2009 | Goodman et al. |
| 2010/0229168 | A1 * | 9/2010 | Maeda ............... G06F 1/3203 718/1 |
| 2010/0306566 | A1 * | 12/2010 | Dehaan ............... G06F 1/3203 713/330 |
| 2011/0010713 | A1 | 1/2011 | Matsumoto et al. |
| 2012/0053925 | A1 | 3/2012 | Geffin et al. |
| 2015/0067682 | A1 | 3/2015 | Calder et al. |
| 2015/0193249 | A1 | 7/2015 | Van Riel et al. |
| 2016/0103711 | A1 | 4/2016 | Gaurav et al. |
| 2016/0156568 | A1 | 6/2016 | Naganuma et al. |
| 2016/0350214 | A1 | 12/2016 | Payer et al. |
| 2017/0031706 | A1 | 2/2017 | Podvratnik et al. |
| 2017/0093742 | A1 | 3/2017 | Cropper et al. |
| 2017/0109187 | A1 | 4/2017 | Cropper et al. |
| 2017/0199564 | A1 * | 7/2017 | Saxena ............... G06F 1/3296 |
| 2018/0239648 | A1 | 8/2018 | Formanek et al. |

OTHER PUBLICATIONS

Aslam et al.: "Using Artificial Neural Network for VM Consoldiation Approach to Enhance Energy Efficiency in Green Cloud," Advances in Data and Information Sciences, Jun. 29, 2018, pp. 139-154, Abstract Only.

Ismaeel et al.: "Proactive dynamic virtual-machine consolidation for energy conservation in cloud data centres," Journal of Cloud Computing: Advances, Systems and Applications (2018) 7:10, 28 pages.

Rolik et al.: "Dynamic Virtual Machine Allocation Based on Adaptive Genetic Algorithm," Cloud Computing 2017 : The Eighth International Conference on Cloud Computing, GRIDs, and Virtualization, pp. 108-114.

Extended European Search Report for European Application No. 19219946.1, dated Jun. 3, 2020, 10 pages.

Deng, et al: "Conserving disk energy in virtual machine based environments by amplifying bursts", Computing, vol. 31, No., pp. 3-21, Feb. 22, 2010, XP019873980.

Son, et al.: "Compiler-Directed Energy Optimization for Parallel-Disk-Based Systems", IEEE Transactions on Parallel and Distributed Systems, vol. 18, No. 9, pp. 1241-1257, Sep. 1, 2007, XP011190137.

Ye, et al.: "Energy-Efficient Storage in Virtual Machine Environments", ACM Sigplan Notices, ACM, vol. 45, No. 7, pp. 75-84, Mar. 17, 2010, XP058083235.

* cited by examiner

202 — Monitor, for a testing time divided into time divisions, a plurality of virtual machines executing on physical machines

204 — Extract performance metadata characterizing consumption of physical resources of the physical machines by the plurality of virtual machines during the testing time, the performance metadata being extracted with respect to each of the time divisions

206 — Classify each of the plurality of virtual machines as active or idle during each time division of the testing time, based on the performance metadata and on idleness criteria, to thereby generate an active-idle series for each of the plurality of virtual machines

208 — Determine, for each active-idle series of each virtual machine of the plurality of virtual machines, at least one periodicity of recurring idle times within the testing time

210 — Predict, for each virtual machine with the at least one periodicity, an on-off model

212 — Transition each of the virtual machines with the at least one periodicity between an on state and an off state in accordance with the predicted on-off model

POWER SAVING THROUGH AUTOMATED POWER SCHEDULING OF VIRTUAL MACHINES

TECHNICAL FIELD

This description relates to power management for virtual machines.

BACKGROUND

Cloud computing provides many features and advantages. In cloud computing, cloud providers provide hardware and software resources to cloud consumers. For example, the cloud providers may be responsible for purchasing, configuring, and deploying large quantities of physical computing resources, such as servers and related network equipment. As such, the cloud providers are typically responsible for the physical resources (e.g., physical space, human administrators, and electrical power) used by such computing resources, as well as for the maintenance and security thereof.

Meanwhile, the cloud consumers are relieved of direct obligations for these and related responsibilities, while obtaining needed computing resources in a fast, flexible manner. Specifically, for example, the cloud consumers may be provided with virtual machines, in which software running on the physical computing resources of the cloud provider(s) partitions those physical computing resources among the cloud consumers. In this paradigm, each cloud consumer uses a local computing device(s) to connect via a network to one or more virtual machines provided by the cloud provider. In this way, the cloud consumer is provided with an ability to access and utilize computing resources in a highly efficient manner.

It is problematic to monitor and manage large numbers of virtual machines in cloud computing environments, in a manner that is efficient and avoids wastefulness of resources. For example, a cloud consumer may utilize a large number of virtual machines, perhaps using multiple cloud providers, for various different purposes. Meanwhile, a cloud provider must provide a large number of requested virtual machines to corresponding cloud consumers, while maintaining specified service levels. Therefore, it is difficult for cloud consumers to avoid an excess capacity of virtual machines, and difficult for cloud providers to use physical resources efficiently.

SUMMARY

According to one general aspect, a system may include a non-transitory computer readable storage medium and at least one processor. When instructions stored on the non-transitory computer readable storage medium are executed by the at least one processor, the system may monitor, for an observation time divided into time divisions, a plurality of virtual machines executing on physical machines, and extract performance data characterizing consumption of physical resources of the physical machines by the plurality of virtual machines during the observation time, the performance data being extracted with respect to each of the time divisions. The system may classify each of the plurality of virtual machines as active or idle during each time division of the observation time, based on the performance data and on idleness criteria, to thereby generate an active-idle series for each of the plurality of virtual machines, and determine, for each active-idle series of each virtual machine of the plurality of virtual machines, at least one periodicity of recurring idle times within the observation time. The system may thus predict, for each virtual machine with the at least one periodicity, an on-off schedule, and transition each of the virtual machines with the at least one periodicity between an on state and an off state in accordance with the on-off schedule.

According to another general aspect, a method may include monitoring, for an observation time divided into time divisions, a plurality of virtual machines executing on physical machines, and extracting performance data characterizing consumption of physical resources of the physical machines by the plurality of virtual machines during the observation time, the performance data being extracted with respect to each of the time divisions. The method may include classifying each of the plurality of virtual machines as active or idle during each time division of the observation time, based on the performance data and on idleness criteria, to thereby generate an active-idle series for each of the plurality of virtual machines, and determining, for each active-idle series of each virtual machine of the plurality of virtual machines, at least one periodicity of recurring idle times within the observation time. The method may further include predicting, for each virtual machine with the at least one periodicity, an on-off schedule; and transitioning each of the virtual machines with the at least one periodicity between an on state and an off state in accordance with the on-off schedule.

According to another general aspect, a computer program product may include instructions recorded on a non-transitory computer readable storage medium and configured, when executed by at least one processor, to cause the at least one processor to access a set of idleness criteria for a plurality of virtual machines executing on a plurality of physical machines, the idleness criteria including a predetermined set of utilization thresholds, defined per time division, of one or more of at least one processor of the physical machines, a network byte rate of data bytes exchanged with a network by the physical machines, and a data transfer rate of data bytes by a memory of the physical machines. The instructions, when executed by at least one processor, may be further configured to cause the at least one processor to extract performance data characterizing consumption of physical resources of the physical machines by the plurality of virtual machines during an observation time, the performance data extracted with respect to the time division during the observation time, and classify each virtual machine as active or idle during each time division of the observation time, based on a comparison of the performance data and the idleness criteria, to thereby obtain an active-idle series for each virtual machine. The instructions, when executed by at least one processor, may be further configured to cause the at least one processor to examine the active-idle series for each virtual machine over a data range that includes time units of one or more of days, weeks, or months, and execute, for the active-idle series of each virtual machine, a frequency analysis in which an active count percentage for each time division of the active-idle series of each virtual machine, relative to the time units of the data range, is compared to a frequency threshold. The instructions, when executed by at least one processor, may be further configured to cause the at least one processor to generate, for each virtual machine, a predicted on-off model, based on the frequency analysis, and transition, following the observation time, each virtual machine between an on state and an off state, based on the predicted on-off model.

The details of one or more implementations are set forth in the accompanying drawings and the description below. Other features will be apparent from the description and drawings, and from the claims.

DETAILED DESCRIPTION

Figure 1:
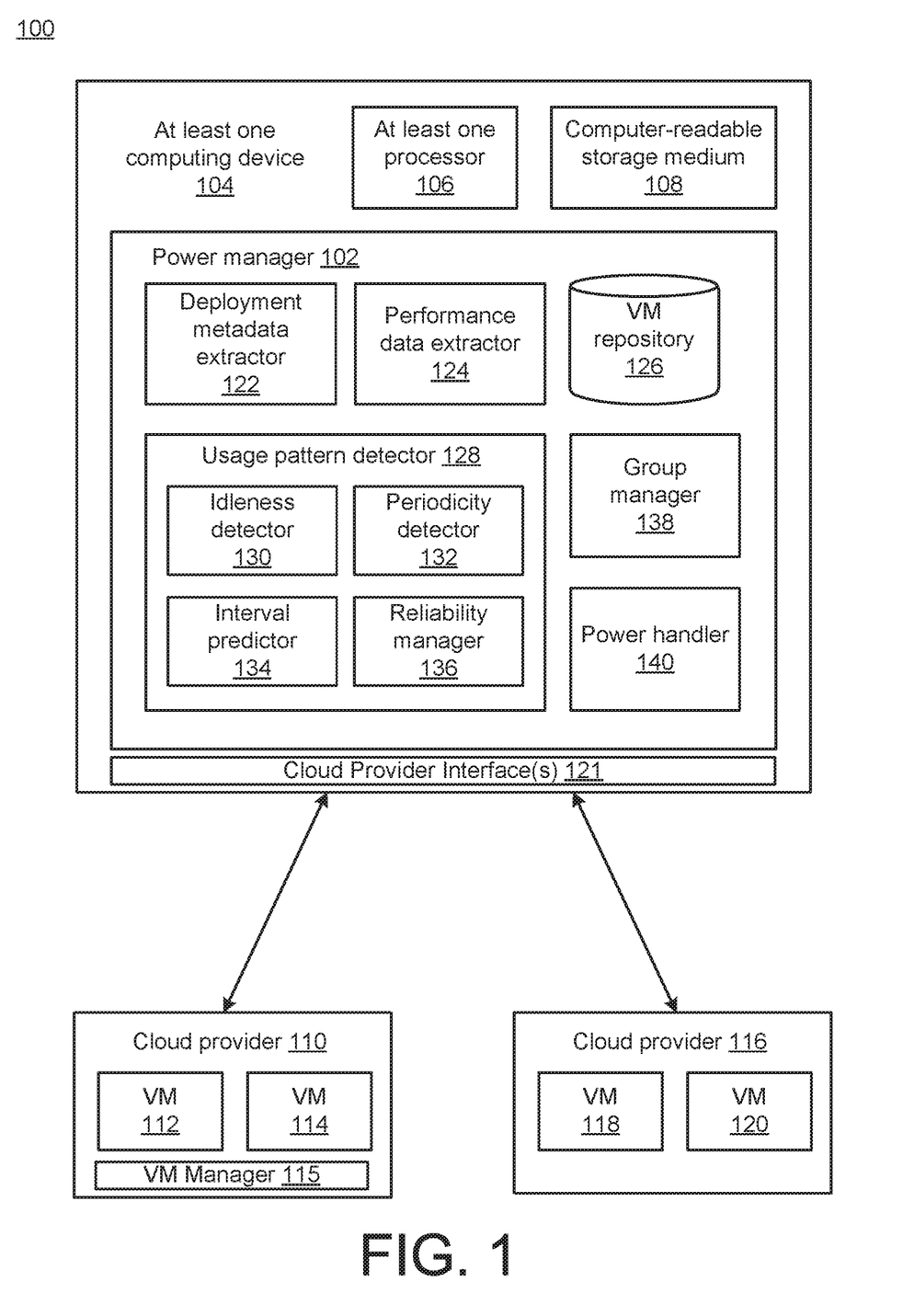
FIG. 1 is a block diagram of a system for power management for virtual machines.

FIG. 1 is a block diagram of a system 100 for power management for virtual machines. In the example of FIG. 1, a power manager 102 is illustrated as being configured to operate on at least one computing device 104, where the at least one computing device 104 includes at least one processor 106, as well as at least one non-transitory, computer readable storage medium 108. That is, the at least one computing device 104 should be understood to represent, e.g., one or more computers operating together. Similarly, the at least one processor 106 may represent any two or more processors, perhaps acting in parallel, and the at least one non-transitory, computer-readable medium 108 is configured for storing data, and/or for storing instructions that are executable by the at least one processor 106.

In various implementations, the at least one computing device 104 may be implemented, or accessed, by a cloud consumer, to thereby enable the cloud consumer to interact with a cloud provider 110 to obtain access to, and use of, illustrated virtual machines 112, 114. Similarly, the power manager 102 at the at least one computing device 104 may enable the cloud consumer to utilize services of a cloud provider 116 in providing virtual machines 118, 120. In other words, such a cloud consumer is generally free to use the services of multiple cloud providers to obtain desired numbers and types of virtual machines.

In the various implementations in which the at least one computing device 104 is provided by a cloud consumer, then, as referenced above, the at least one computing device 104 may represent a large number of computing devices. In such scenarios, many different persons or entities may be provided with access to the virtual machines 112, 114 and the virtual machines 118, 120.

For example, although highly simplified for clarity and conciseness of explanation, FIG. 1 includes and represents scenarios in which, for example, a large business or other entity, perhaps having large numbers of employees and/or departments, utilizes a correspondingly large number of virtual machines. Accordingly, and similarly, it will be appreciated that the cloud providers 110, 116 may represent three or more cloud providers, as well, and that the virtual machines 112/114 and 118/120 may represent hundreds, thousands, or more virtual machines that may be deployed and used by the cloud consumer by way of the at least one computing device 104.

In these and similar implementations, the cloud providers 110/116, in addition to providing physical computing resources, such as physical machines, as described above, typically provide various management functions for, e.g., instantiating, deploying, monitoring, maintaining, and otherwise managing all virtual machines provided by the cloud provider 110, including the virtual machines 112, 114. Thus, in the example of FIG. 1, the cloud provider 110 is illustrated as including a virtual machine manager 115, which provides these and related functions, including interacting with a suitable cloud provider interface 121 that may be accessed by the at least one computing device 104.

The cloud provider interface(s) 121 thus represents a potential plurality of interfaces for interacting with the cloud providers 110, 116, as well as other cloud providers, to thereby utilize VM management functionalities of such cloud providers, represented by the VM manager 115 of the cloud provider 110. During normal operations of the system 100, any authorized person or administrator role may utilize the one or more cloud provider interfaces 121, and any associated management software provided by the cloud consumer, to deploy new virtual machines. Once deployed, such virtual machines may be accessed and utilized by additional persons or roles authorized for such access.

For example, the cloud consumer implementing the at least one computing device 104 may represent a software development company. Authorized personnel within the software development company may commission and deploy a number of virtual machines, such as the virtual machines 112, 114, for use by various teams of software developers. Meanwhile, other administrative functions of the software development business, such as accounting or human resources, may also include personnel authorized to commission and deploy additional virtual machines, such as the virtual machines 118, 120.

In such scenarios, in which a large number of personnel at a cloud consumer deploy and utilize a large number of virtual machines across a plurality of cloud providers, it is difficult to avoid waste of computing resources. For example, each cloud provider 110, 116 will typically maintain a service level agreement with the cloud consumer, governing use and operations of virtual machines provided by that cloud provider. In scenarios described herein, the cloud consumer is responsible for the deployment and use of such virtual machines in accordance with corresponding service level agreements, regardless of a level of actual activity of such virtual machines by the cloud consumer.

In other words, for example, if the virtual machine 112 is turned on and executing using underlying physical, computing resources of the cloud provider 110, then the cloud consumer using the at least one computing device 104 has the freedom to determine whether to actively use the virtual machine 112 to varying extents, or to let the virtual machine 112 sit idle. However, allowing periods of low activity or idleness of the virtual machine 112 is wasteful of the physical computing resources of the cloud provider 110. As a consequence, the cloud provider might decide to deactivate these machines, in accordance with, and to an extent governed by, the corresponding service level agreement.

Accordingly, as described herein, the power manager 102 may be configured to transition the virtual machines 112, 114 and the virtual machines 118, 120 between an on state and an off state. For example, the power manager 102 may be configured to activate and deactivate the virtual machines 112/114 and 118/120, in a manner that conserves physical resources of the cloud providers 110, 116, while minimizing undesirable or unacceptable losses of availability of the VM's 110/114 and 118/120 by the cloud consumer using the at least one computing device 104. Put another way, and as described in detail below, the power manager 102 is configured to monitor virtual machine usages, predict periodic schedules of usage for the future, and actively turn on/turn off individual or groups of virtual machines in accordance with the predicted schedules.

For example, the power manager 102 includes a deployment metadata extractor 122. The deployment metadata extractor 122 is configured to monitor, detect, and otherwise extract deployment metadata characterizing a manner and extent to which the various example virtual machines 112/114 and 118/120 are deployed.

For example, such deployment metadata may include characterizations of when, how, and by whom each virtual machine was deployed, as well as characterizations of the personnel using each virtual machine. For example, in the software development example described above, the deployment metadata may include an identification of the administrator who deployed the relevant virtual machines being used for software development, as well as the different teams of software developers using each virtual machine, along with details describing the individuals and teams. For example, some software developers, or groups of software developers, may be designated as working in particular time zones, or with particular work schedules, or on particular projects or types of projects.

Other types of deployment metadata may include characterizations of the types of applications or other services being provided on, or by, each virtual machine. In other examples, it may occur that one or more virtual machines are provided with tags, where such tags generally refer to categories or labels that may be assigned to virtual machines, individually or as groups. Other examples of such deployment metadata are provided below, or would be apparent.

In addition to such deployment metadata, a performance data extractor 124 may be configured to monitor the various virtual machines and extract performance metrics and other data characterizing ongoing operations of the various virtual machines. Such performance data may include, for example, CPU utilization, network transfer rates, memory usage, and transfer rates between different memories being used.

In other words, such performance data references a manner and extent to which each virtual machine utilizes its assigned physical resources, such as physical machines, from among the physical resources available at the corresponding cloud provider. For example, the performance data may characterize, in absolute terms, quantities of processing, memory, and data transfer resources being utilized. In other examples, the same or similar performance metrics may be tracked relative to the levels of each such resource stipulated to be provided within a relevant service level agreement with the cloud provider in question. As with the deployment metadata as referenced above, additional or alternative examples of such performance data are provided below, or would be apparent.

In the simplified example of FIG. 1, a virtual machine repository 126 is illustrated as being utilized to store one or both of the deployment metadata and the performance data. For example, the virtual machine repository 126 may be understood to represent an example implementation of one type of the non-transitory computer readable storage medium 108, used here for data storage. Of course, the different types of metadata may be stored using different databases or other repositories, and may be accessed as needed, using suitable queries or other access requests.

In the example of FIG. 1, a usage pattern detector 128 is configured to access the virtual machine repository 126, to thereby discover and characterize usage patterns of the various virtual machines 112/114 and 118/120. For example, the usage pattern detector 128 is illustrated as including an idleness detector 130 that is configured to classify each of the virtual machines 112/114 and 118/120 as being active or idle during each of a plurality of time divisions of a test time during which usage patterns are being detected.

For example, during operation of the power manager 102, an observation time may be initiated, and defined with respect to one or more specific time divisions. For example, a user of the power manager 102 may initiate an observation time that is either open-ended, or that has a defined end point of days, weeks, months, or years.

The observation time, and associated extraction of virtual machine data/metadata, such as the deployment metadata and the performance data, may be defined with respect to specified time divisions. For example, the virtual machine metadata may be extracted and/or characterized on an hourly basis, and use of the hour as the smallest relevant time division of the observation time implemented by the power manager 102 is utilized in the various examples that follow.

Of course, it will be appreciated that other time divisions may be utilized. For example, relevant time divisions may be defined in terms of minutes, groups of minutes, or other absolute time scale, or may be defined with respect to specific usage of the virtual machines 112/114 and 118/120 in question. For example, the time divisions may be defined in terms of blocks of time of standard employee work shifts, or portions thereof, that may be particularly relevant or applicable to the cloud consumer utilizing the power manager 102.

Continuing the examples in which the time division utilized is the hour, the idleness detector 130 may be configured to apply predetermined idleness criteria to classify, for each hour, each virtual machine as being either active or idle. Specific examples of such idleness criteria are provided in detail, below. In general, it will be appreciated that such idleness criteria specifies minimum or maximum rates or quantities of physical computing resources utilized by each virtual machine during each hour being characterized, as well as combinations thereof.

For example, idleness criteria may specify maximum usage rates or amounts of CPU utilization, memory utilization, and/or data transfer utilization, or combinations thereof. In this way, the idleness detector 130 may be configured to generate an active-idle series for each of the virtual machines 112/114 and 118/120.

A periodicity detector 132 may be configured to analyze each resulting active-idle series provided by the idleness detector 130. The periodicity detector 132 is configured to determine whether a periodicity of recurring idle times exist within a relevant observation time for each virtual machine. For example, the periodicity detector 132 may detect that the virtual machine 112 has an idle period lasting one or more time divisions, and that occurs with a periodicity defined in terms of hours, days, weeks, or months. For example, an idle period may occur that lasts two hours and that occurs every day from midnight to 2:00 am with a relevant time zone of the virtual machine 112.

As described in detail below, the periodicity detector 132 may be configured to determine and define periods of recurring idle times for each virtual machine with varying levels of confidence. In other words, the periodicity detector 132 is not necessarily required to detect an absolute or complete period of recurring idle times. For example, in the example given above in which a two-hour idleness window occurs daily at midnight, it may occur that the relevant idleness window does not occur every day during the relevant observation time. The idleness window may occur six out of seven days of a week, or 28 days out of 30 days of a month. Thus, the periodicity detector 132 may be configured to designate an extent to which periods of recurring idle times occur, without necessarily requiring complete adherence to the detected idle times by each virtual machine in question.

The idleness detector 130 and the periodicity detector 132 are thus configured to collect and analyze existing metadata that is collected and stored within the virtual machine repository 126. An interval predictor 134 is configured to utilize the periods defined by the periodicity detector 132, to predict intervals at which each of the virtual machines 112/114 and 118/120 should be turned off or turned on during future operations thereof.

During initial operations, the interval predictor 134 may predict such on/off schedules for the various virtual machines, and conduct reliability estimation thereof, prior to utilizing the predicted intervals. For example, a reliability manager 136 may be configured to detect and compare the predicted on/off intervals for a virtual machine, with actual use or activity of that virtual machine (as determined from corresponding performance data within the virtual machine repository 126). Based on these comparisons, an accuracy and reliability of the predicted intervals may be quantified and characterized.

For example, in the simplified example above in which the virtual machine 112 is predicted to be turned off each day between midnight and 2:00 am, the reliability manager 136 may monitor actual, ongoing virtual machine performance data for the virtual machine 112 from the repository 126, to thereby test an accuracy of the predicted interval. In other words, for example, the reliability manager 136 may determine a number or percentage of times that the virtual machine 112 experiences active utilization during the time window of predicted idleness.

Put another way, during a reliability estimation time that is included within the observation time, the reliability manager 136 may compare actual idleness times exhibited by the virtual machine 112 during the reliability estimation time, as compared to the predicted idleness times provided by the interval predictor 134. Similarly, the reliability manager 136 may compare actual active times exhibited by the virtual machine 112 during the reliability estimation time, as compared to predicted active times. In cases in which the resulting reliability of the predicted intervals does not reach a determined reliability threshold, the reliability manager 136 may initiate a feedback loop to one or more of the idleness detector 130, the periodicity detector 132, and/or the interval predictor 134, so that more accurate and reliable intervals may be predicted.

As described above, although the simplified example of FIG. 1 illustrates only the virtual machines 112/114 and 118/120, practical scenarios may include, e.g., cloud consumers who utilize hundreds or thousands of virtual machines, across a plurality of cloud providers. To assist with power management in these scenarios, a group manager 138 is configured to access deployment metadata from within the virtual machine repository 126. The group manager 138 may use the deployment metadata to group virtual machines for inclusion as groups within on/off power intervals predicted by the interval predictor 134 and tested by the reliability manager 136. In this way, for example, entire groups of virtual machines may be turned off and on together, thereby increasing an overall efficiency of operations of the power manager 102.

As described in detail below, any of the deployment metadata referenced above, or described in more detail below, may be used alone or in combination by the group manager 138 to define groups of virtual machines for collective on/off scheduling. For example, it may occur that the virtual machine 114 and the virtual machine 120 are utilized by the same team of software developers, and/or are deployed with the same or similar applications installed thereon. Consequently, the virtual machines 114/120 may be turned on/off together as part of a defined group, even though the virtual machines 114/120 are deployed on the different cloud providers 110/116.

Thus, in general, and as described in more detail below, presence of the same or similar deployment metadata across one or more groups of virtual machines may be indicative of, or correlated with, the same or similar on/off power schedule. In other scenarios, it may occur that groups of virtual machines defined by the group manager 138 do not have exactly overlapping power intervals. Nonetheless, it may occur that efficiencies obtained from grouping virtual machines for power scheduling may outweigh overall reductions in reliability of adherence of individual virtual machines to intervals predicted for those virtual machines.

For example, two or more virtual machines may have the same or similar predicted intervals, but with differing levels of reliability as determined by the reliability manager 136. As just referenced, overall efficiency may be improved by accepting the lower level of reliability of the virtual machines in question. Put another way, a system designer is advantageously provided with the flexibility to configure relative levels of reliability and efficiency in a predicted power schedule.

More generally, the reliability manager 136 may operate in estimating a reliability of each group defined by the group manager 108, in a manner similar to the reliability estimation techniques described herein that are performed with respect to individual virtual machines. In particular, for example, outputs of the reliability manager 136 may be utilized in appropriate feedback loops with respect to any of the idleness detector 130, the periodicity detector 132, the interval predictor 134, and the group manager 138, in order to ensure that predicted and tested power interval schedules are sufficiently reliable for application thereof to the various virtual machines represented by the virtual machines 112/114 and 118/120.

Once the reliability estimation time of the overall observation time has been completed, the resulting power schedule may be provided to a power handler 140. The power handler 140 is configured to turn the identified groups of virtual machines on and off in accordance with the predicted power schedule during an implementation time of operation of the power manager 102.

During the ensuing power transitions executed by the power handler 140, the power manager 102 may continue to execute one or more parallel procedures. For example, the deployment metadata extractor 122 and/or the performance data extractor 124 may continue to extract and store virtual machine metadata within the virtual machine repository 126. Additionally, a subsequent observation time may be implemented, including associated detections of updated usage patterns, along with updated grouping operations of the group manager 138.

Accordingly, an updated power schedule may be implemented by the power handler 140. For example, the updated power schedule may replace the preceding power schedule after a predetermined quantity of time. In other examples, detected updates to the deployment metadata and/or the performance data may trigger a transition to the updated power schedule. For example, changes in the deployment metadata may obviate, or reduce in applicability of, the groups calculated by the group manager 138. In some implementations, the power handler 140 may be configured to interact with the cloud provider interfaces 121 to execute the desired power schedule power. For example, the power handler 140 may utilize one of the cloud provider interfaces 121 to interact with the VM manager 115 of the cloud provider 110.

In the examples described above, the at least one computing device 104 is described as being implemented by a cloud consumer that is consuming virtual machine services from the cloud providers 110, 116. In other example implementations, however, the at least one computing device 104 may be implemented by either or both of the cloud providers 110, 116.

For example, the cloud provider 110 may implement the power manager 102 to conserve physical resources of the cloud provider 110. For example, the cloud provider 110 may implement a large number of virtual machines across a large number of underlying physical machines, and for a plurality of cloud consumers. In general, the cloud provider 110 may desire to utilize its physical computing resources efficiently, such as by consolidating virtual machines for operation on the fewest necessary numbers of physical machines.

By turning off groups of virtual machines using the power manager 102 as described herein, the cloud provider 110 may be provided with an ability, for example, to turn off some or all virtual machines executing on a particular physical machine. Accordingly, the cloud provider 110 may be provided with an ability to at least temporarily deactivate such a physical machine, and/or may be facilitated in efforts to consolidate the turned-off virtual machines to another physical machine that is currently being under-utilized.

Figure 2:
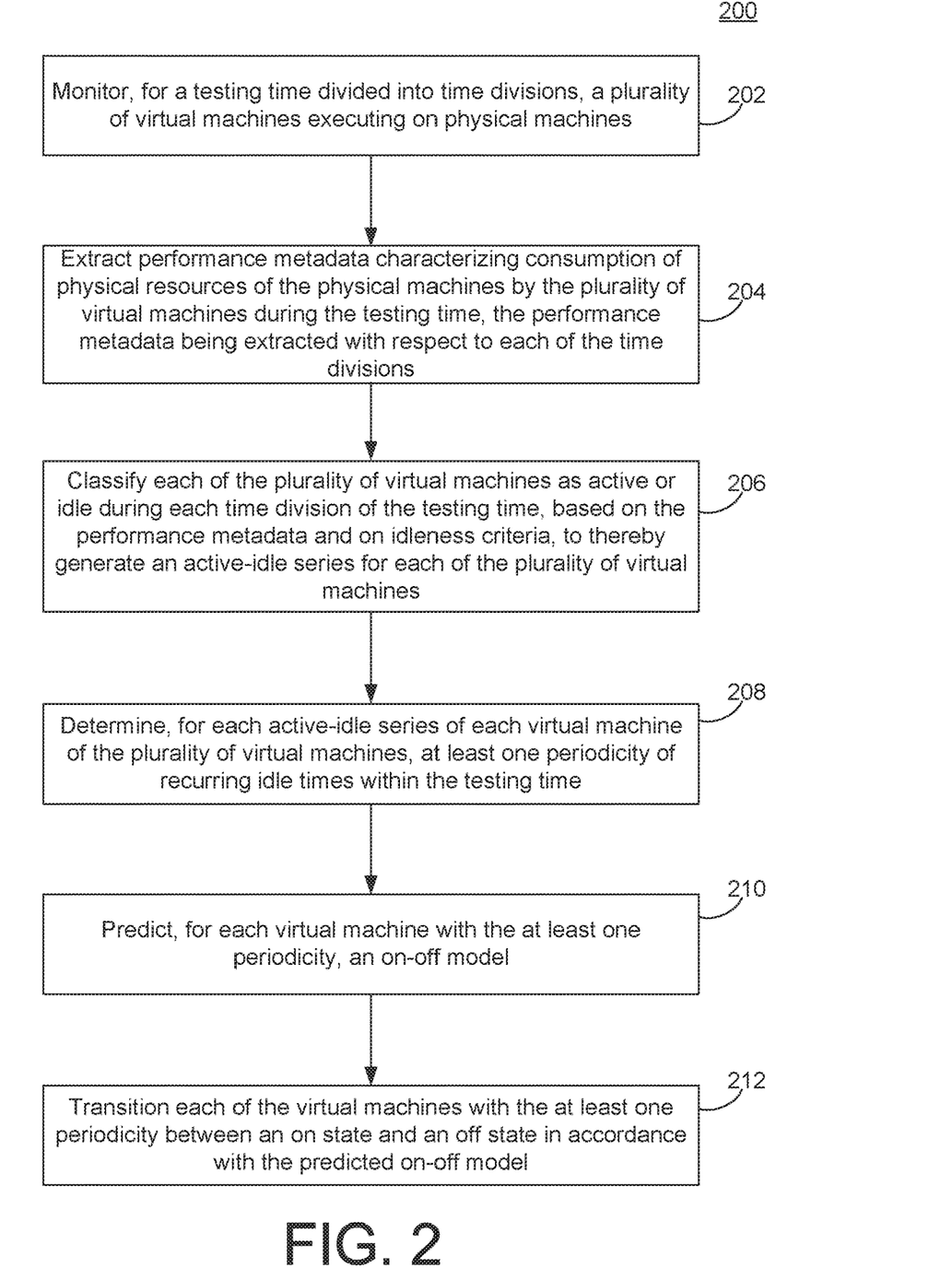
FIG. 2 is a flowchart illustrating example operations of the system of FIG. 1.

FIG. 2 is a flowchart illustrating more detailed example operations of the system 100 of FIG. 1. In the example of FIG. 2, operations 202-212 are illustrated as separate, sequential operations. In various implementations, it may occur that additional or alternative operations or sub-operations may be included, and/or one or more operations or sub-operations may be omitted. Further, in all such implementations, it will be appreciated that various operations or sub-operations may be executed in a partially or completely overlapping or parallel manner, or in a nested, branched, looped, or iterative fashion.

In the example of FIG. 2, for an observation time divided into time divisions, a plurality of virtual machines executing on physical machines may be monitored (202). For example, the power manager 102, e.g., the deployment metadata extractor 122 and/or the performance data extractor 124, may utilize one or more cloud provider interfaces 121 to monitor aspects of the virtual machines 112/114 and 118/120. Thus, as described, such monitoring may be performed at or by a cloud consumer, which may consume virtual machines from multiple cloud providers. As also described, such monitoring may be performed by a single cloud provider, with respect to virtual machines provided by that cloud provider to a plurality of cloud consumers.

Performance data characterizing consumption of physical resources of the physical machines by the virtual machines during the observation time may be extracted, the performance data being extracted with respect to each of the time divisions (204). For example, the performance data extractor 124 may extract performance data characterizing consumption of physical resources of both the cloud provider 110 and the cloud provider 116 caused by the virtual machines 112/114 and 118/120, respectively. Where the applicable unit or division of time is, e.g., one hour, then the relevant performance data may be extracted and/or stored within the virtual machine repository 126 in hourly increments. As also referenced, physical resources of physical machines of the cloud providers 110, 116 should be understood broadly to refer, for example, to any server, computer, router, switch, processor, memory, or other computer or network-related hardware. Such physical resources may be characterized using any appropriate or suitable manner, such as, for example, processing cycles, quantities of memory used, transfer rates, or consumed power. Further, the performance data may be extracted and stored with respect to each virtual machine, although it will be appreciated that all such performance data represents, characterizes, and could be expressed in terms of, usage of corresponding, underlying physical resources of physical machines.

Each of the plurality of virtual machines may be classified as active or idle during each time division of the observation time, based on the performance data and on idleness criteria, to thereby generate an active-idle series for each of the plurality of virtual machines (206). For example, as referenced above and described and detail below, such idleness criteria may be implemented by the idleness detector 130, for example, specified combinations of the relevant performance data characterizations of the physical resources, relative to predefined idleness threshold or arranges. The resulting active-idle series for each of the virtual machines 112/114 and 118/120 may thus be understood to be represented as a series of consecutive hourly increments, in which each hour is effectively marked active or idle.

For each active-idle series of each virtual machine of the plurality of virtual machines, at least one periodicity of recurring idle times may be determined to exist within the observation time (208). For example, the periodicity detector 132 of the usage pattern detector 128 of FIG. 1 may be configured to analyze each active-idle series and execute one or more algorithms to determine whether and to what extent a periodicity exists. For example, depending on a length of time of the observation time, the periodicity detector 132 may detect one or more periods that are daily, weekly, or monthly.

The periodicity detector 132 may also quantify or characterize a confidence level or strength of a detected periodicity. For example, a detected daily idle period may occur at a single time of every day of the observation time, and with the same duration of idleness each day. In other examples, however, a given virtual machine may exhibit the detected daily period for only a percentage of days of the observation time. During other days of the observation time, the same virtual machine may not exhibit any idle time during the one or more detected idle hours, and/or may exhibit only a partial or overlapping idleness.

For each virtual machine with the at least one periodicity, an on/off model may be predicted (210). For example, the interval predictor 134 may be configured to receive detected periods, and characterizations thereof, from the periodicity detector 132. The interval predictor 134 may execute interval prediction criteria to generate the power on/off schedule.

For example, a detected period may be required to have a threshold level of confidence, duration, or other characteristic prior to being used by the interval predictor 134. In some implementations, as described, the predicted intervals may be tested using the reliability manager 136, prior to proceeding with actual para-cycling of the various virtual machines by the power handler 140.

For example, the observation time may continue with, and include, a reliability estimation time during which the reliability manager 136 utilizes virtual machine metadata from the virtual machine repository 126 to assess the accuracy and reliability of the intervals predicted by the interval predictor 134. For example, the extractors 122, 124 may continue to extract the various types of virtual machine metadata described herein during the reliability estimation time, for use by the reliability manager 136. By using, for example, further outputs of the idleness detector 130, the reliability manager 136 may effectively compare actual virtual machine metadata with the intervals predicted by the interval predictor 134. In this way, for example, the reliability manager 136 may characterize an extent to which the predicted intervals would have incorrectly resulted in turning off a virtual machine that was actually used during the predicted idle time, or, conversely, a number of times that a virtual machine is idle during a predicted active time.

Each of the virtual machines with the at least one periodicity may be transitioned with the at least one periodicity between an on state and an off state in accordance with the predicted on/off model (212). For example, the power handler 140 may be configured to turn on, and turn off, any of the virtual machines 112/114 and 118/120. Accordingly, resources associated with providing those virtual machines may be conserved.

Although not illustrated specifically with respect to FIG. 2, the group manager 138 may be configured to utilize the deployment metadata provided by the deployment metadata extractor 122, and stored in the virtual machine repository 126, to group various ones of the virtual machines 112/114 and 118/120 for collective power cycling thereof.

Figure 3:
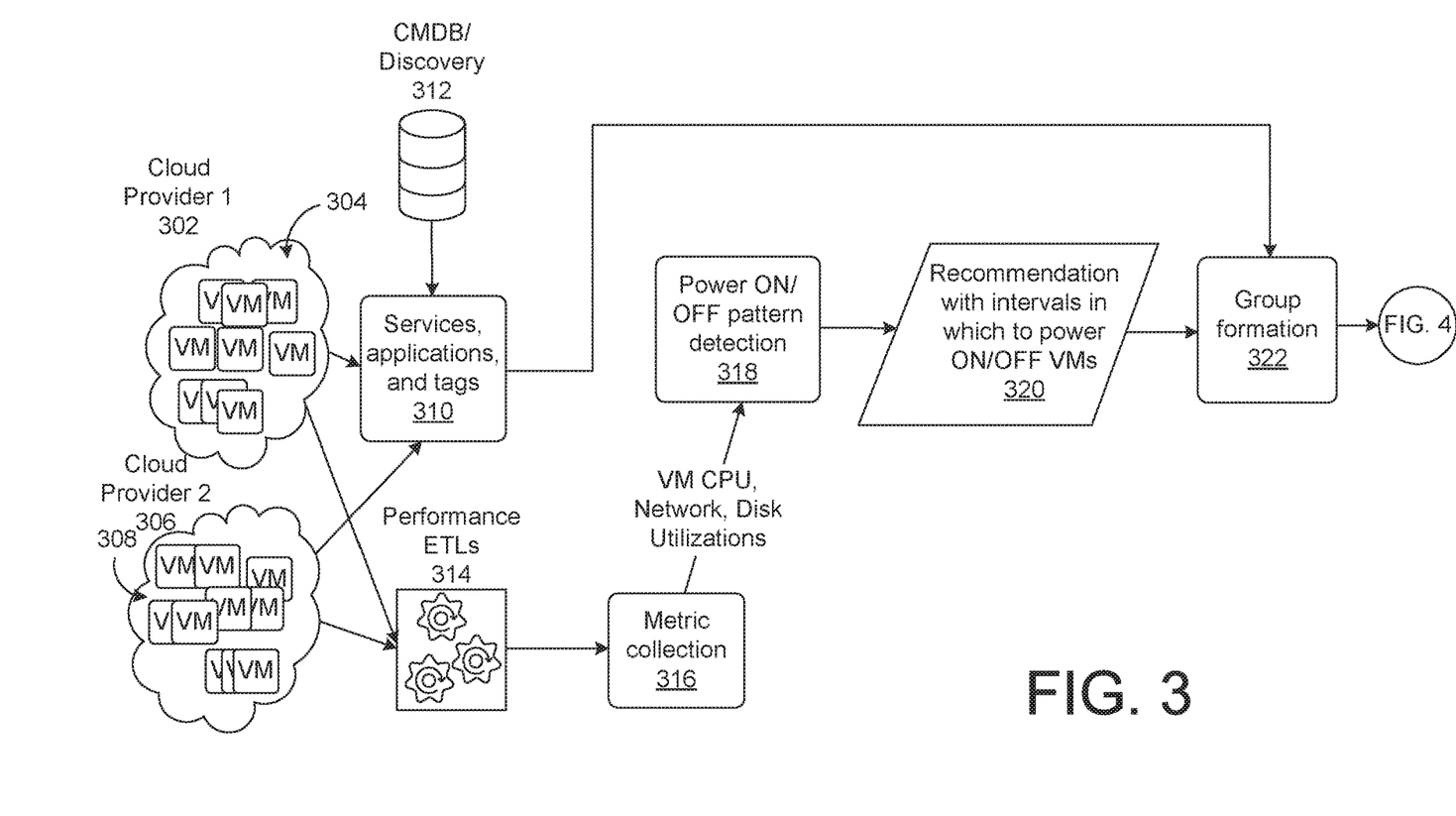
FIG. 3 is a block diagram illustrating a first example operational flow of the system of FIG. 1.
Figure 4:
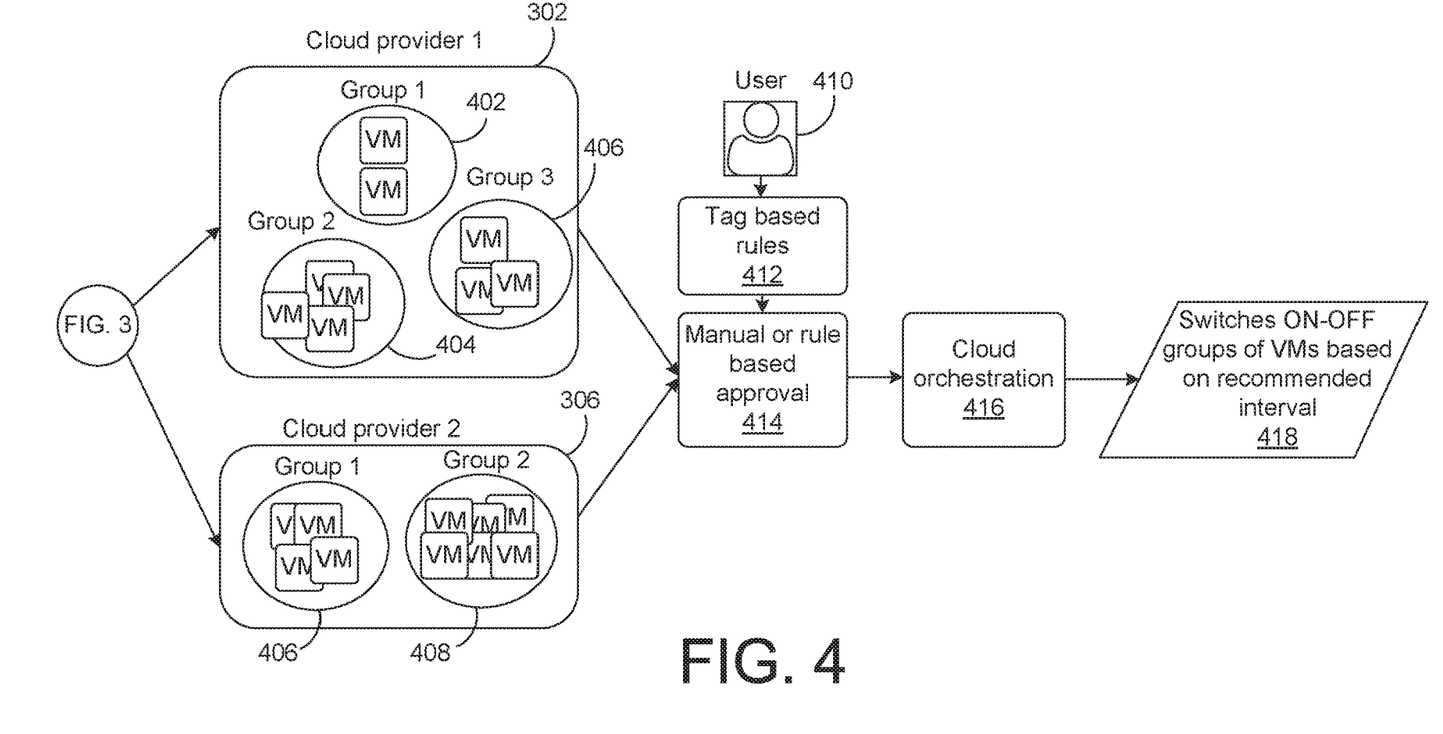
FIG. 4 is a block diagram illustrating a second example operational flow of the system of FIG. 1.

FIGS. 3 and 4 are block diagrams illustrating example operational flows of the system 100 of FIG. 1 and the flowchart 200 of FIG. 2. In the example of FIG. 3, a first cloud provider 302 is illustrated as including and providing a plurality of virtual machines 304. Meanwhile, a second cloud provider 306 is illustrated as including and providing a plurality of virtual machines 308.

In FIG. 3, services, applications, and tags may be discovered and extracted, as an example implementation of the deployment metadata extractor 122, and the resulting deployment metadata may be stored using database 312, illustrated as a configuration management database (CMDB)/discovery database and providing an example of the virtual machine repository 126 of FIG. 1. Further in FIG. 3, performance ETLs (extract, transform, load parameters) are further run to extract example performance data, e.g., information characterizing performance metrics illustrated in FIG. 3 as performance ETLs.

The resulting metric collection 316, including, in the example, virtual machine CPU, network, and disc utilization metrics, may be provided for power on/off pattern detection 318. As described, such usage patterns represent recurring periods in which the virtual machines may be powered on or off based on recommendations of exact time schedules 320.

The previously-discovered and extracted services, applications, tags, and other deployment metadata may then be used for group formation 322. That is, the recommended on/off power schedules may be used by the group manager 138 of FIG. 1 to group pluralities of virtual machines collective power cycling.

For example, continuing the example of FIG. 3 and FIG. 4, the first cloud provider 302 is illustrated as including a first group of virtual machines 402, the second group 404, and the third group 406. Meanwhile, the second cloud provider 306 is illustrated as including a first group 406 and a second group 408. In various implementations, groups may be formed within a single cloud provider, as shown in FIG. 4, or across multiple cloud providers.

Further in FIG. 4, a user 410, such as an administrator at the cloud consumer consuming the various virtual machines of cloud providers 302, 306 may apply tag base rules 412 to determine whether to provide approval of the generated power schedule and group formation predictions. As illustrated, the approval 414 may also include rule-based approval, not requiring human intervention.

Cloud orchestration 416 may then be used to switch groups of virtual machines on and off, in accordance with the recommendation power schedules, as shown in block 418. For example, with reference back to FIG. 1, suitable cloud provider interfaces 121 may be utilized by the power handler 140 of the power manager 102 to instruct and execute collected power cycling of the described groups of virtual machines, in accordance with the predicted power schedules.

Figure 5:
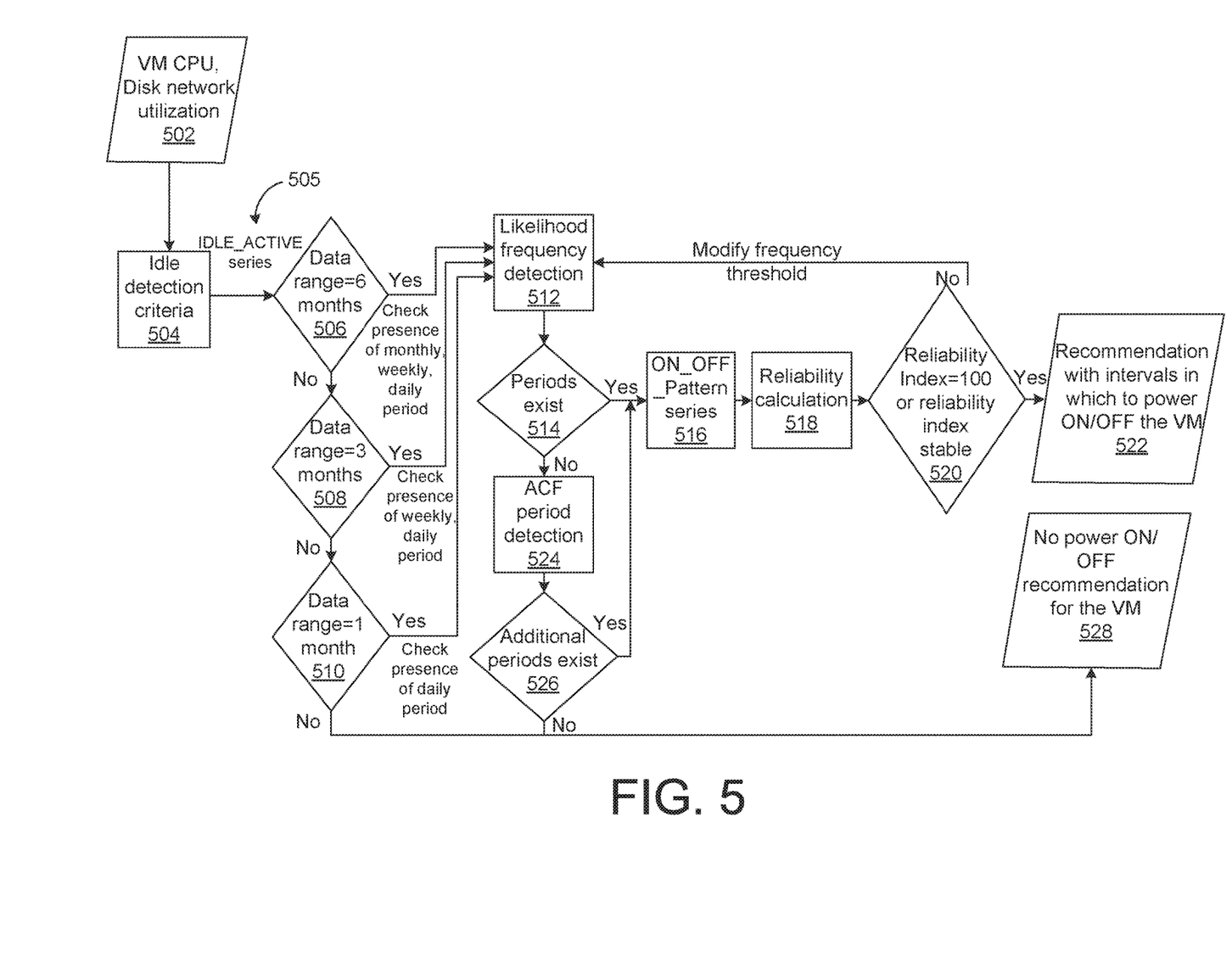
FIG. 5 is a flowchart illustrating more detailed example operations of the system of FIG. 1, for predicting periodic intervals for performing power sequencing of virtual machines.

FIG. 5 is a flowchart illustrating more detailed example operations of the system 100 of FIG. 1. Specifically, FIG. 5 illustrates more detailed example operations of the usage pattern detector 128.

As described with respect to FIG. 1, the idleness detector 130 is configured to access performance data extracted by the performance data extractor 124 and stored within the virtual machine repository 126. In the example of FIG. 5, such performance data includes performance data 502, which is illustrated as including virtual machine CPU utilization, disk transfer rates, and network utilization (e.g., network byte rate).

As also described above, the performance data 502 may be processed by the idleness detector 130, based on predetermined idle detection criteria 504. For example, the performance data 502 may each be described with respect to performance metrics designed relative to minimum or maximum usage rates, or usage amounts. Such bounded performance metric values may thus be considered, alone or in combination, with respect to each time division of the observation time.

For example, a given virtual machine may be defined to be idle within an hour, if, for that hour, the virtual machine has a CPU utilization that is lower than a specified threshold, a network byte rate that is lower than a certain rate threshold, and/or a disc transfer rate that is lower than a predefined threshold. Thus, for example, a virtual machine may be considered idle during an hour in which the CPU utilization of the virtual machine is less than, e.g., 5%, a network byte rate used by the virtual machine is lower than, e.g., 200 kilobits per second, and/or a disk transfer rate of the virtual machine is lower than, e.g., 100 kilobytes per second. Of course, other suitable ranges and parameter thresholds may be used.

Thus, the idle detection criteria being used may be configured in any suitable or desired manner. For example, in addition to varying the thresholds for each performance metric, the idle detection criteria 504 may utilize additional or alternative performance metrics, and combinations thereof. For example, in the example just given, the idle detection criteria may be considered to be met if any two of the three performance metric values are below their relevant thresholds.

Thus, in the example, the idleness detector 130 may be configured to make idleness determinations on an hourly basis, to thereby provide an idle_active series 505 for each virtual machine. For example, the idle_active series 505 may be constructed as a binary, 0-1 series. That is, in such examples, if a virtual machine is idle in a given hour, then the series is assigned a value of 0 for that hour, and is otherwise assigned a value of 1.

In the following portions of FIG. 5, the idle_active series 505 is analyzed to determine the existence of periods, if any, which exhibit recurring patterns during which the virtual machine transitions from actively working to idleness. As referenced above, an initial determination for extracting these recurring periods includes a range of time (and associated metadata) from which the recurring periods may potentially be extracted. In general, longer ranges will provide more types of recurring periods that may be detected.

For example, as shown in FIG. 5, in example scenarios a data range considered may be six months in length (506), three months in length (508), or one month in length (510). For example, for a data range that includes six months (506), the presence of monthly, weekly, or daily periods, or combinations thereof, may be detected. For example, an example of a relevant pattern may include a virtual machine working every month on the first two days of the month, and between the hours of 3:00 pm and 10:00 pm, or a virtual machine working each month, in the first two weeks of the month, and only on Saturdays and Sundays.

For a data range of three months (508), the presence of weekly, daily, or weekly/daily combinations, may be detected. For example, a virtual machine may work every week, but only on the weekends between 3:00 pm and 8:00 pm, while being idle during the rest each week.

For a data range of one month (510), daily periods may be detected. For example, such daily periods of idleness may repeat every day, at the same hour or hours. For example, this pattern may include a virtual machine working every day between 9:00 am and 6:00 pm, while being idle during the rest of the time in that day.

In the example of FIG. 5, as shown, the idleness detector 130 may make a yes or no determination at each available data range 506, 508, 510. If one or more of the data ranges is available, then the periodicity detector 132 may proceed to execute one or more period detection algorithms.

In the example of FIG. 5, the periodicity detector 132 is configured to implement a frequency detection (512) to find a likelihood of respective, underlying recurring periods on the analyzed metadata, using only points within the relevant range. For example, to find a daily period, a frequency analysis may be executed that includes determining or obtaining, e.g., counting, a number of active hours over all days within the relevant range. Then, if a percentage of such active hours, which may be referred to as an active percentage, is greater than a predefined frequency threshold, then the virtual machine in question is determined to be switched on for the relevant hour being considered.

The frequency threshold may be initially selected to represent a trade-off between capacity availability and resource optimization. For example, an active percentage count may be computed as a percentage that is defined as a count of active values for the specific hour within the range that is being considered, divided by the total number of samples for that hour within the range.

For example, an hour under consideration may be the hour that occurs between 3:00 pm and 4:00 pm for a particular virtual machine. For one month (e.g., 30 days) of collected performance data, each of the 30 instances of the 3:00 pm-4:00 pm hour may be considered. As described above with respect to the idle_active series 505, each of the 30 considered hours will have a value of 0 or 1. If, in one example, each of the 30 hour instances has a value of 1, so that the virtual machine is considered to have been active for each hour of each day being considered, and the active count percentage would be 100%.

On the other hand, if, in the same scenario, it may occur that the 3:00 pm-4:00 pm hour being considered for each of the 30 days may have an active count of 15 out of the available 30 days. Then, the active count percentage would be 50%. If the frequency threshold is defined to have a value of, e.g., 70%, then the active count percentage would exceed the frequency threshold in the first example, but would not exceed the frequency threshold in the second example.

To find a weekly on-off pattern, the same counting mechanism just described may be repeated to obtain a weekly frequency analysis. For example, for a range that includes one or more months, (hour, week day) pair may be constructed. That is, each hour value may be assigned between 1-24, while each day of the week value may be assigned between 1-7. Then, over all weeks in the range being considered, if the hourly active percentage for each hour exceeds the frequency threshold that has been set, then these hours on the day of the week in which these hours are found are considered to potentially exhibit a recurring pattern.

For example, for a range of three months, a total number of weeks is 12 weeks. A number of times that the virtual machine in question was active for each hour may be counted, superimposing the same day of the week for all of the 12 weeks in the dataset. This approach is one example of how to identify the existence of weekly patterns, as well as daily patterns, within the range being considered. This approach is described and illustrated in more detail below, with respect to FIG. 6. Generally, in a simplified example, however, it may occur that a given virtual machine is determined to work only every Saturday and Sunday, from 3:00 pm-10:00 pm and 1:00 am-5:00 am, each week.

In a final example of the frequency detection 512, to find a monthly period, a monthly frequency analysis may be performed, which extends the approach just described above for weekly period detection. That is, for example, (hour, day of the month) pair may be constructed for each hour across all of the months in the range being considered. In other words, a pair (hour, day of the month) may be constructed in which the hour value ranges between 1-24, and the day of the month value ranges between 1-31.

Using this approach, days in every month the range being considered may be identified in which recurring activity occurs. Moreover, the specific hours in which a pattern is found may be identified. For example, over a range of six months, a virtual machine examined may be determined to be active on every $4^{th}$, $5^{th}$, and $6^{th}$ day of the month, during an interval of 5:00 pm-11:00 pm.

In the types of examples described above, the frequency threshold may be set at a desired level, and may be adjusted, as well, as described below. Recurring patterns may equivalently be defined as recurring periods of activity, or recurring periods of idleness. For example, in some scenarios a given virtual machine may only be active for a few hours each week, or each month, while being idle during a remainder of a range being considered. On the other hand, other virtual machines may only be active for small percentages of time during the range being considered.

If one or more periods are found to exist (514), an active periods model may be obtained which fills a 1.0 hourly series that is called on_off_pattern series (516). In FIG. 5, in which represents an hour recommended to be switched on for the virtual machine in question, and 0 represents an hour where the virtual machine should be switched off.

Multiple algorithms may be utilized, if necessary or desired, to determine active or idle periods. For example, if the frequency detection approach is unable to find a recurring period, an auto correlation function (ACF) may be used for further potential period detection (524).

In the approach of the ACF, periodicity is detected by computing an auto correlation function of the idle_active series, then detecting peaks in the resulting function and finding the average distance between them. An output of ACF showing a relevant peak at a given time offset indicates the existence of a periodicity that does not fall in a daily/weekly/monthly periodicity. For instance, ACF may spot periodicities such as "every 5 hours".

Thus, this approach may help finding non-expected periodicity. The ACF method is sensitive to noise and random variability overlapped with the periodic signal, which typically occurs in performance data. The periodicity detector 132 complements this with the likelihood/frequency approach that, while operating only on fixed periods (predefined but very probable in IT systems), compensates noise using the frequency threshold, as described herein.

If the ACF period detection (524) or other period detection techniques do not find the existence of recurring periods (526), then the process of FIG. 5 will be stopped for the virtual machine being considered, and no recommendation for the VM being considered is provided (528).

On the other hand, if additional periods are found to exist (526), then the same time of on_off_pattern series (516) may be provided. The resulting on_off_pattern series may then be subjected to the types of reliability calculation (518) described above with respect to the reliability manager 136 of FIG. 1. For example, as described above, the reliability calculation (518) may be executed during a reliability estimation time that is included within the overall observation time. That is, as described, the on_off_pattern series (516) is utilized and compared during the reliability estimation time against current or recent performance data that continues to be collected by the performance data extractor 124. In other words, in the example of FIG. 5, the utilization metadata 502 is collected continuously during the reliability estimation time, and classified as active or idle. Then, the resulting active/idle series obtained for each virtual machine from the ongoing utilization metadata 502 is compared, hour for hour, with the predicted on_off_pattern series (516).

Then, a reliability index may be calculated and tested (520). For example, the reliability index may be calculated as a percentage of hours in the active/idle series of the ongoing performance data 502, relative to each corresponding hour of the predicted on_off_pattern series (516). According to this definition, the reliability index may have a value of 100 in scenarios in which each hour of the idle_active series calculated for the ongoing performance data matches each corresponding hour of the on_off_pattern series (516). Put another way, based on a relevant observation period, reliability of a virtual machine may be understood to represent a difference between a number of hours the virtual machine is predicted to be idle and a number of hours the virtual machine was not idle, divided by the number of hours the virtual machine is predicted to be idle.

In various examples, it is not necessary for the reliability index to have a value of 100, and lower values for the reliability index may be determined to be acceptable, depending on other system parameters. For example, mission-critical machines may be required to have a higher reliability index than virtual machines which are used to execute tasks that are not time sensitive. The reliability index may be set by the reliability manager 136, and may be configured to be applicable to each implementation of the system 100 as a whole, or may be modified to have different values for different groups of virtual machines, or may be changed based on extracted deployment metadata obtained by the deployment metadata extractor 122 and stored using the virtual machine repository 126 (e.g., virtual machines running different applications or services may be provided with different reliability indexes).

In some implementations, as illustrated in FIG. 5, additional requirements for testing the reliability index may be implemented. For example, a stability of the reliability index within a certain range and exhibited over a defined time period may be required. In some example implementations, reliability index stability and a minimum reliability index value may be required, while in other implementations, only some combination of one or both may be required.

If the reliability test is passed, then the recommendation with intervals in which to power on/off the virtual machine in question may be provided (522). Otherwise, as shown, a feedback loop may be provided in which, for example, a relevant frequency threshold is modified, and period detection is repeated (512-520, 524, 526). For example, if the reliability index that is calculated is undesirably low, then the frequency threshold may be modified to apply more stringent requirements for period detection. In other examples, however, if the reliability index equals 100, then the frequency threshold may be modified in a direction to relax requirements for period detection.

For example, the period detection, pattern prediction, and reliability testing operations may be repeated, while progressively and iteratively increasing the frequency threshold, with a stable reliability value as the exit condition. In such examples, the on_off_pattern series corresponding to the first threshold at which the reliability index stabilized is returned as the pattern found. In the example, at this point, the on/off pattern for the virtual machine in question is considered to have been found.

The operations of FIG. 5 may be repeated for all relevant virtual machines. Where possible, the operations of FIG. 5 may be repeated for each virtual machine in parallel. As also described above, once the operations of FIG. 5 have been repeated for all available virtual machines, the resulting on/off schedules may be processed by the group manager 138.

For example, as described, the virtual machines may be grouped by services, applications, and tags, along with relevant time zones and other factors and in a manner that provides coinciding and/or overlapping on/off schedules. Similarly to the reliability index described above, a group index may be calculated which reflects an extent to which on/off schedules of each virtual machine of each group matches with other virtual machines of that group. For example, a group index of 100 may indicate that all virtual machines of a specific group have exactly corresponding and overlapping on_off_patterns.

For example, if a virtual machine in a group has an idle hour each week that is an active hour for remaining virtual machines of that group, then the virtual machine in question may simply be left on along with the remaining virtual machines of the group, and notwithstanding the actual active/idle series prediction for that virtual machine. In such cases, in other words, the benefit of being able to collectively power cycle the group as a whole may be considered to outweigh the disadvantage of leaving the virtual machine on during an hour that is idle for that virtual machine.

On the other hand, it may occur that a virtual machine is predicted to be active during an hour in which a remainder of the virtual machines of the group are predicted to be idle. In such cases, the determination of whether to turn off the virtual machine in question for the hour that issue may depend on various factors. For example, such factors may include the percentage of the virtual machines predicted to be active or idle during the hour in question, or the criticality of operations of the virtual machine that would be turned off during an hour in which activity is predicted.

In general, it is possible to enforce or relax grouping constraints by expanding or contracting on/off intervals to include more virtual machines within the group being formed. Once the groups are defined, the groups may be tested in a manner similar to the reliability testing described above, and subjected to a feedback loop to optimize the groupings. In other examples, an administrator may or deny approval of the group that's been formed.

Once groups have been formed, cloud credentials for the virtual machines in question may be utilized by the power handler 140 to turn the various virtual machines on or off in groups, and based on the recommended, scheduled intervals.

Figure 6:
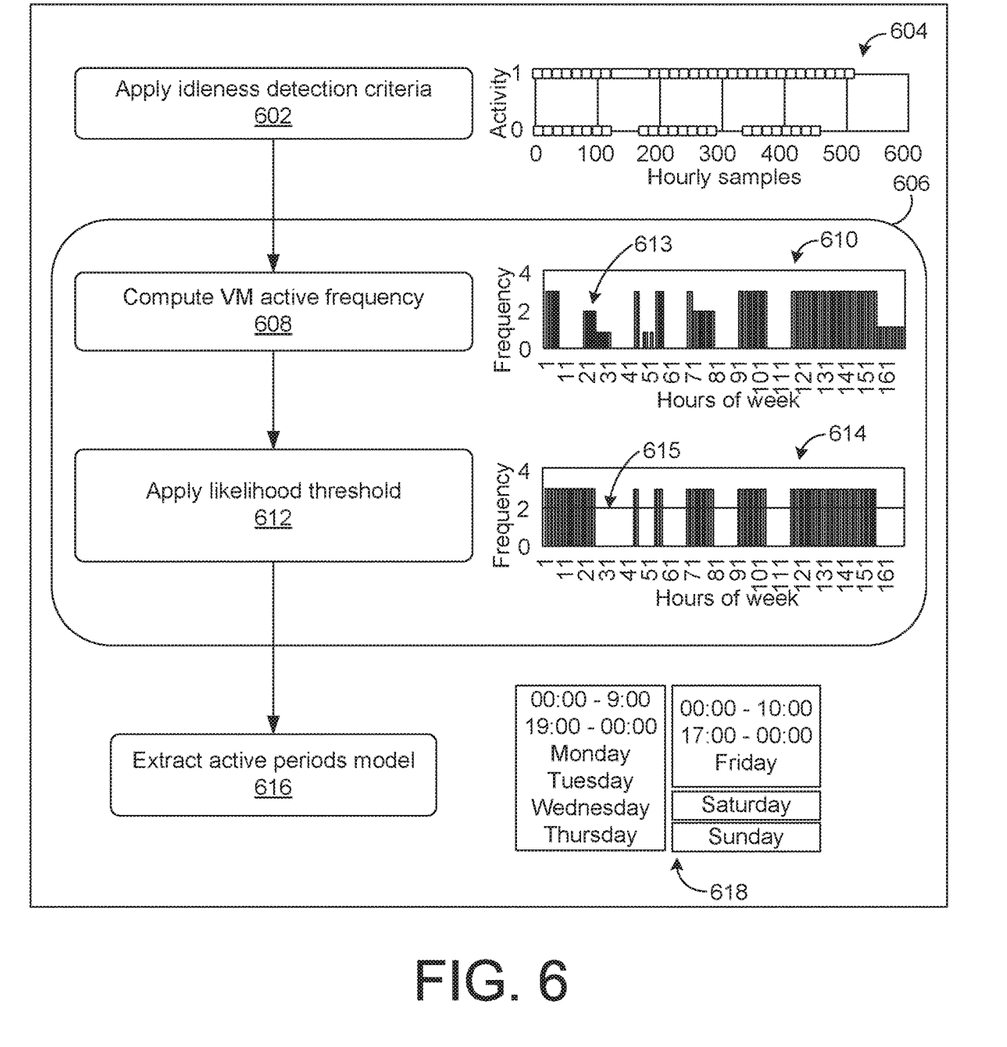
FIG. 6 is a flowchart illustrating an example implementation of FIGS. 1-5, including specific examples of the predicted periods of FIG. 5.

FIG. 6 is a flowchart illustrating an example implementation of FIGS. 1-5, including specific examples of the predicted periods of FIG. 5. In the example of FIG. 6, the techniques of FIG. 5 are used to find a weekly period. As shown, the idleness criteria is applied (602), such as by the idleness detector 130 of FIG. 1, to obtain active-idle series 604. That is, as shown, the active-idle series 604 identifies active and idle hours over a data range of about 500 hours, or about 3 weeks. Of course, FIG. 6 is simplified for the sake of example, and longer data ranges may be used.

The periodicity detector 132 of FIG. 1 may be used to implement periodicity detection (606). As shown, and as just described with respect to FIG. 5, the periodicity detector 132 may first compute an active frequency of the virtual machine in question (608). Graph 610 illustrates the frequency that the virtual machine will be active (or idle) during each hour of each of the three weeks of the example.

Then, the frequency threshold may be applied (612). That is, as shown, graph 614 includes a cutoff or threshold 615, which requires a frequency of at least two of the three weeks of the example. It may be observed from application of the threshold 615 that some portions of the frequency count of the graph 610 are no longer included in the graph 614, such as counts 213.

In this way, the interval predictor 134 may proceed to predict an active period model, or on-off model (616), illustrated as model 618. In the example, active time windows are predicted for the illustrated times on Monday and Friday, while the virtual machine would be turned off for the remainder of Monday/Friday, and the rest of the week (Saturday/Sunday and Tuesday-Thursday), so that resources may be conserved.

Implementations of the various techniques described herein may be implemented in digital electronic circuitry, or in computer hardware, firmware, software, or in combinations of them. Implementations may be implemented as a computer program product, i.e., a computer program tangibly embodied in a machine-readable storage device (computer-readable medium) for processing by, or to control the operation of, data processing apparatus, e.g., a programmable processor, a computer, or multiple computers. A computer program, such as the computer program(s) described above, can be written in any form of programming language, including compiled or interpreted languages, and can be deployed in any form, including as a stand-alone program or as a module, component, subroutine, or other unit suitable for use in a computing environment. A computer program can be deployed to be processed on one computer or on multiple computers at one site or distributed across multiple sites and interconnected by a communication network.

Method steps may be performed by one or more programmable processors executing a computer program to perform functions by operating on input data and generating output. Method steps also may be performed by, and an apparatus may be implemented as, special purpose logic circuitry, e.g., an FPGA (field programmable gate array) or an ASIC (application-specific integrated circuit).

Processors suitable for the processing of a computer program include, by way of example, both general and special purpose microprocessors, and any one or more processors of any kind of digital computer. Generally, a processor will receive instructions and data from a read-only memory or a random access memory or both. Elements of a computer may include at least one processor for executing instructions and one or more memory devices for storing instructions and data. Generally, a computer also may include, or be operatively coupled to receive data from or transfer data to, or both, one or more mass storage devices for storing data, e.g., magnetic, magneto-optical disks, or optical disks. Information carriers suitable for embodying computer program instructions and data include all forms of non-volatile memory, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory may be supplemented by, or incorporated in special purpose logic circuitry.

To provide for interaction with a user, implementations may be implemented on a computer having a display device, e.g., a cathode ray tube (CRT) or liquid crystal display (LCD) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Implementations may be implemented in a computing system that includes a back-end component, e.g., as a data server, or that includes a middleware component, e.g., an application server, or that includes a front-end component, e.g., a client computer having a graphical user interface or a Web browser through which a user can interact with an implementation, or any combination of such back-end, middleware, or front-end components. Components may be interconnected by any form or medium of digital data communication, e.g., a communication network. Examples of communication networks include a local area network (LAN) and a wide area network (WAN), e.g., the Internet.

While certain features of the described implementations have been illustrated as described herein, many modifications, substitutions, changes and equivalents will now occur to those skilled in the art. It is, therefore, to be understood that the appended claims are intended to cover all such modifications and changes as fall within the scope of the embodiments. It should be understood that they have been presented by way of example only, not limitation, and various changes in form and details may be made. Any portion of the apparatus and/or methods described herein may be combined in any combination, except mutually exclusive combinations. The embodiments described herein can include various combinations and/or sub-combinations of the functions, components and/or features of the different embodiments described.

What is claimed is:

1. A system including a non-transitory computer readable storage medium and at least one processor, wherein instructions stored on the non-transitory computer readable storage medium are configured to cause the at least one processor to:
monitor, for an observation time divided into time divisions, a plurality of virtual machines executing on physical machines;
extract performance data characterizing consumption of physical resources of the physical machines by the plurality of virtual machines during the observation time, the performance data being extracted with respect to each of the time divisions;
classify each of the plurality of virtual machines as active or idle during each time division of the observation time, based on the performance data and on idleness criteria, to thereby generate an active-idle series for each of the plurality of virtual machines;
determine, for each active-idle series of each virtual machine of the plurality of virtual machines, at least one periodicity of recurring idle times within the observation time;
predict, for each virtual machine with the at least one periodicity, an on-off schedule; and
transition each of the virtual machines with the at least one periodicity between an on state and an off state in accordance with the on-off schedule.

2. The system of claim 1, wherein the time divisions are hours, and wherein the performance data includes hourly utilization of at least one processor of the physical machines, a network byte rate of data bytes exchanged with a network by the physical machines, and a data transfer rate of data bytes by a memory of the physical machines.

3. The system of claim 1, wherein the idleness criteria include a predetermined set of utilization thresholds, for each time division, of two or more of at least one processor of the physical machines, a network byte rate of data bytes exchanged with a network by the physical machines, and a data transfer rate of data bytes by a memory of the physical machines.

4. The system of claim 1, wherein the instructions, when executed to determine the at least one periodicity, are further configured to cause the at least one processor to:
examine the active-idle series for a data range that includes time units of one or more of days, weeks, or months; and
execute, for the active-idle series, a frequency analysis in which an active count percentage for each time division of the active-idle series, relative to the time units of the data range, is compared to a frequency threshold.

5. The system of claim 4, wherein the instructions, when executed to predict the on-off schedule, are further configured to cause the at least one processor to:
predict the on-off schedule for each virtual machine based on the frequency analysis.

6. The system of claim 4, wherein the instructions, when executed, are further configured to cause the at least one processor to:
calculate, prior to the transition, a reliability index of the on-off schedule during a reliability estimation time of the observation time, including comparing the on-off schedule calculated for each virtual machine to an actual schedule thereof during the reliability estimation time.

7. The system of claim 6, wherein the instructions, when executed, are further configured to cause the at least one processor to:
determine that the reliability index is lower than a reliability threshold; and
adjust the frequency threshold to improve the reliability index; and
re-execute the frequency analysis with the adjusted frequency threshold.

8. The system of claim 1, wherein the instructions, when executed, are further configured to cause the at least one processor to:
extract deployment metadata characterizing a manner in which each virtual machine is deployed during the observation time, including one or more of an installed application, a service, or an assigned user.

9. The system of claim 8, wherein the instructions, when executed, are further configured to cause the at least one processor to:
define a group of the plurality of virtual machines, based on the deployment metadata and on similarity of on-off schedules of each virtual machine of the group;
determine a group on-off schedule for the group; and
transition the group between the on state and the off state collectively, and in accordance with the group on-off schedule.

10. The system of claim 1, wherein the plurality of virtual machines are provided by at least two cloud providers providing the physical machines.

11. A method comprising:
monitoring, for an observation time divided into time divisions, a plurality of virtual machines executing on physical machines;
extracting performance data characterizing consumption of physical resources of the physical machines by the plurality of virtual machines during the observation time, the performance data being extracted with respect to each of the time divisions;
classifying each of the plurality of virtual machines as active or idle during each time division of the observation time, based on the performance data and on idleness criteria, to thereby generate an active-idle series for each of the plurality of virtual machines;
determining, for each active-idle series of each virtual machine of the plurality of virtual machines, at least one periodicity of recurring idle times within the observation time;
predicting, for each virtual machine with the at least one periodicity, an on-off schedule; and
transitioning each of the virtual machines with the at least one periodicity between an on state and an off state in accordance with the on-off schedule.

12. The method of claim 11, wherein the time divisions are hours, and wherein the performance data includes hourly utilization of at least one processor of the physical machines, a network byte rate of data bytes exchanged with a network by the physical machines, and a data transfer rate of data bytes by a memory of the physical machines.

13. The method of claim 11, wherein the idleness criteria include a predetermined set of utilization thresholds, for each time division, of two or more of at least one processor of the physical machines, a network byte rate of data bytes exchanged with a network by the physical machines, and a data transfer rate of data bytes by a memory of the physical machines.

14. The method of claim 11, wherein the determining the at least one periodicity comprises:
examining the active-idle series for a data range that includes time units of one or more of days, weeks, or months; and
executing, for the active-idle series, a frequency analysis in which an active count percentage for each time division of the active-idle series, relative to the time units of the data range, is compared to a frequency threshold.

15. The method of claim 14, wherein the predicting the on-off schedule comprises:
predicting the on-off schedule for each virtual machine based on the frequency analysis.

16. The method of claim 14, further comprising:
calculating, prior to the transition, a reliability index of the on-off schedule during a reliability estimation time of the observation time, including comparing the on-off schedule calculated for each virtual machine to an actual schedule thereof during the reliability estimation time.

17. The method of claim 11, further comprising:
extracting deployment metadata characterizing a manner in which each virtual machine is deployed during the observation time, including one or more of an installed application, a service, or an assigned user;
defining a group of the plurality of virtual machines, based on the deployment metadata and on similarity of on-off schedules of each virtual machine of the group;
determining a group on-off schedule for the group; and
transitioning the group between the on state and the off state collectively, and in accordance with the group on-off schedule.

18. A computer program product including instructions recorded on a non-transitory computer readable storage medium and configured, when executed by at least one semiconductor processor, to cause the at least one processor to:
access a set of idleness criteria for a plurality of virtual machines executing on a plurality of physical machines, the idleness criteria including a predetermined set of utilization thresholds, defined per time division, of one or more of at least one processor of the physical machines, a network byte rate of data bytes exchanged with a network by the physical machines, and a data transfer rate of data bytes by a memory of the physical machines;
extract performance data characterizing consumption of physical resources of the physical machines by the plurality of virtual machines during an observation time, the performance data extracted with respect to the time division during the observation time;
classify each virtual machine as active or idle during each time division of the observation time, based on a comparison of the performance data and the idleness criteria, to thereby obtain an active-idle series for each virtual machine;
examine the active-idle series for each virtual machine over a data range that includes time units of one or more of days, weeks, or months;
execute, for the active-idle series of each virtual machine, a frequency analysis in which an active count percentage for each time division of the active-idle series of each virtual machine, relative to the time units of the data range, is compared to a frequency threshold;
generate, for each virtual machine, a predicted on-off model, based on the frequency analysis; and
transition, following the observation time, each virtual machine between an on state and an off state, based on the predicted on-off model.

19. The computer program product of claim 18, wherein the instructions, when executed, are further configured to cause the at least one processor to:
extract deployment metadata characterizing a manner in which each virtual machine is deployed during the observation time, including one or more of an installed application, a service, or an assigned user.

20. The computer program product of claim 19, wherein the instructions, when executed, are further configured to cause the at least one processor to:
define a group of the plurality of virtual machines, based on the deployment metadata and on similarity of on-off schedules of each virtual machine of the group;
determine a group on-off schedule for the group; and
transition the group between the on state and the off state collectively, and in accordance with the group on-off schedule.

* * * * *